Sept. 27, 1966   P. W. STRIPP ETAL   3,275,144
FLUID FILTERS

Filed July 18, 1963   2 Sheets-Sheet 1

Peter William Stripp
and Edwin Colin Sperry
INVENTORS

BY

Mason, Kolehmainen, Rathburn &Wyss ATTORNEYS

Sept. 27, 1966  P. W. STRIPP ETAL  3,275,144
FLUID FILTERS

Filed July 18, 1963  2 Sheets-Sheet 2

Peter William Stripp
and Edwin Colin Spry
INVENTORS

BY
Mason, Kolehmainen, Rathburn & Wyss
ATTORNEYS

United States Patent Office 3,275,144
Patented Sept. 27, 1966

3,275,144
FLUID FILTERS
Peter William Stripp, Plymouth, Devon, and Edwin Colin Spry, Plympton, Devon, England, assignors to Tecalemit (Engineering) Limited, Plymouth, Devon, England
Filed July 18, 1963, Ser. No. 296,069
Claims priority, application Great Britain, July 19, 1962, 27,917/62
1 Claim. (Cl. 210—130)

This invention relates to fluid filters and it is more especially concerned with filters for liquids, including particularly, but not exclusively, oil filters for internal combustion engines. The invention has amongst its objects the provision of improvements in such filters.

It is one of the objects of the invention to provide an improved fluid filter which includes within it a pressure relief valve which is adapted to open automatically to allow fluid to by-pass the filter should the pressure difference between the fluid entering and leaving the filter exceed a predetermined value, as a result, for example, of the filter becoming clogged.

A further object of the invention is the provision of improvements in fluid filters having a casing or cover on which a connection is fitted for the attachment of a pipe conveying fluid to or from the filter, whereby limited angular movement is rendered possible between the pipe and the casing or cover, should this be required during the fitting or assembly of the filter or during use or when the filter is being dismantled, for example for cleaning or when replacing a filter element.

A still further object of the invention is the provision of improved means for forming seals between the various parts of the filter, and also the provision of improved means for securing the various parts of the filter together.

Further objects, features and advantages of the invention will appear from the following description, taken in conjunction with the accompanying drawings.

As will appear from the description the invention is applicable both to filters which are constructed as separate units, which are adapted to be connected with or attached to engines or other apparatus, and also to filters parts of which are constituted by parts of internal combustion engines or other pieces of equipment.

For the better understanding of the invention, in its various aspects, reference will be made to the accompanying drawings, in which.

Figure 1:
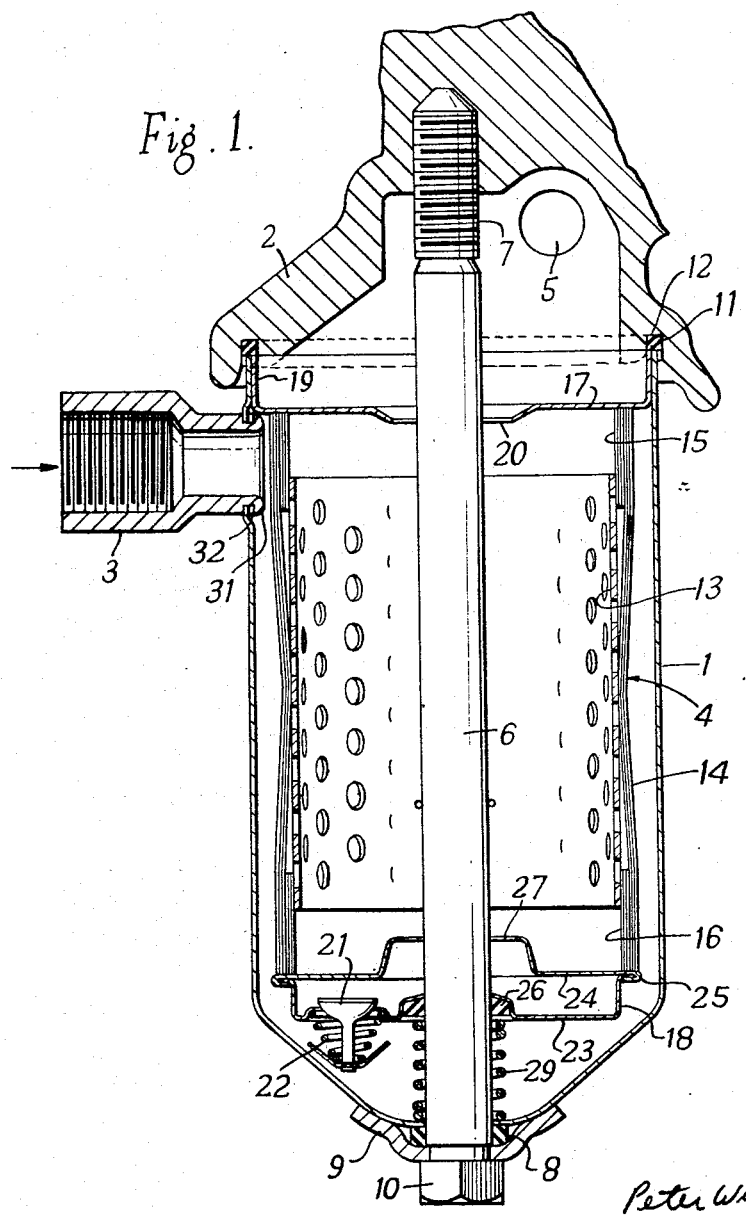
FIGURE 1 is a sectional view showing an oil filter which exemplifies the present invention and which is shown as being attached to and forming part of an internal combustion engine or other machine.

Referring first to FIGURE 1, this shows a filter having a cover 1 which is attached to and forms a seal with a part 2 of an internal combustion engine or other machine of which the filter forms a part. The cover 1 is provided with an inlet 3 for the admission of the oil to be filtered, which oil after passing through a filter element 4 is discharged through an outlet 5 which is formed in the part 2.

As is clear from the drawing, the cover 1 is secured to the part 2 by means of a stud 6, the upper end 7 of which is threaded and screwed into the part 2. In order to prevent escape of oil a resilient sealing ring 8, which may be made of a synthetic rubber or other suitable elastomeric material is provided on the stud 6; it is arranged to be compressed between the cover 1 and a cap washer 9 which is fitted to the stud under the head 10 of the latter.

Furthermore, a sealing ring 11, which may also be made of a synthetic rubber or other suitable elastomeric material, is fitted in a groove 12 which is formed in the part 2; this ring 11 is engaged by the upper edge of the cover 1 so as to form an oil-tight seal between the cover and the part 2.

The filter element 4 may be of a cylindrical, spirally-wound, pleated or other suitable type, but a filter element of a cylindrical type is shown in the drawings. This element comprises a cylindrical support 13, which may be made of perforated metal, wire gauze or other suitable material possessing the necessary strength. This support carries one or more outer layers 14 made of a filter material in sheet form. Examples of such materials are felt, made of natural or synthetic fibres, and various forms of filter papers.

As will appear from the drawing the upper and lower ends of the filter material 14 surround and are attached to short sleeves 15 and 16, which may be made of a similar material and which are rigidly attached to the ends of the support 13.

The filter element 4, when fitted in the filter, is engaged and held between an upper pressure member in the form of a cap 17 and a bottom pressure member, which is indicated generally at 18 and which is of a hollow form. The upper and lower ends of the element 4, which are constituted by the upper and lower edges of the filter material 14 and of the sleeves 15 and 16, engage and form seals with the pressure members 17 and 18.

As shown in the drawing, the pressure member 17 is cup-shaped; its peripheral wall 19 fits in the upper end of the cover 1 and its edge forms a seal with the ring 11 and thus with the part 2. The member 17 has a central opening 20 through which the oil, after filtration, is discharged towards the outlet 5.

The pressure member 18 is hollow and it carries a normally-closed pressure relief valve 21. This is shown as being of the mushroom type and it is normally held closed on its seat by means of a spring 22.

As shown, the member 18 comprises a bottom part 23, of cup-shape, to which a top part 24 is fitted, these parts being secured together by bending over their edges, as shown at 25, or by other means. The valve 21 is mounted in the botom part 23, as shown in the drawing.

Both the parts 23 and 24 are formed with central holes for the passage of the stud 6, but the part 23 is arranged to be a close fit on the stud 6, where a sealing ring 26 made of an elastomeric material, such as a synthetic rubber, is fitted to prevent leakage of oil. The upper part 24, however, is formed with a larger hole 27 which will allow the passage of oil to the interior of the filter element should an increase in the pressure difference between the oil entering and leaving the filter, as a result of the filter element 4 becoming blocked, reach a predetermined value sufficient to cause the valve 21 to open.

A compression spring 29 surrounding the stud 6 holds the pressure member 18 pressed against the filter element 4 and thus presses the upper end of the latter against the member 17. The upper edge of the member 17 is thus held pressed against the sealing ring 11, with which it forms a seal. It will thus be seen that the single sealing ring 11 provides a fluid-tight seal between the cover 1, the body part 2 and the upper pressure member 17.

While the inlet 3 could be in the form of a boss made of metal or other rigid material and could itself be rigidly secured to the cover 1, it is preferred to make the inlet 3 of a resilient material, such as a suitable synthetic plastic, or to attach it to the cover 1 in such a way as to allow limited angular movement of the inlet with respect to the cover or to provide a combination of such a connection with the use of a resilient material for the inlet boss itself, the object in each case being to permit limited angular movement of the inlet boss relatively to the casing, which may be useful when the filter is being fitted and connected up to the fluid system and/or while the filter is in use.

In the construction shown in FIGURE 1, the inlet boss 3 is fitted in a hole formed in the side of the cover 1 and has its inner end 31 turned over with the interposition, between it and the cover 1, of a ring 32 formed of a synthetic rubber or other plastic or like material which possesses sufficient resiliency to allow limited angular movement of the inlet boss 3 relatively to the cover 1. The inlet boss 3 may itself be made of a rigid material, such as a metal or a hard synthetic plastic, or it may be made of a material possessing a suitable degree of resiliency, such as a synthetic plastic or other elastomer. In the latter case the ring 32 could be made of metal or other rigid material.

Alternatively, particularly if a rigid inlet is used, it would be possible to use a pair of resilient rings corresponding to the ring 32 but with one arranged inside and one outside the wall of the cover 1.

According to yet another arrangement it would be possible to use a rigid inlet boss which is rigidly connected with the wall of the cover 1, for example by welding or by other means. In this case the resiliency provided by the casing wall itself could be used to allow limited angular movement of the inlet relatively to the cover, provided that the cover 1 is designed and constructed with this in mind. An example of such an inlet connection is shown in and will be described with reference to FIGURE 2 of the drawings.

Figure 2:
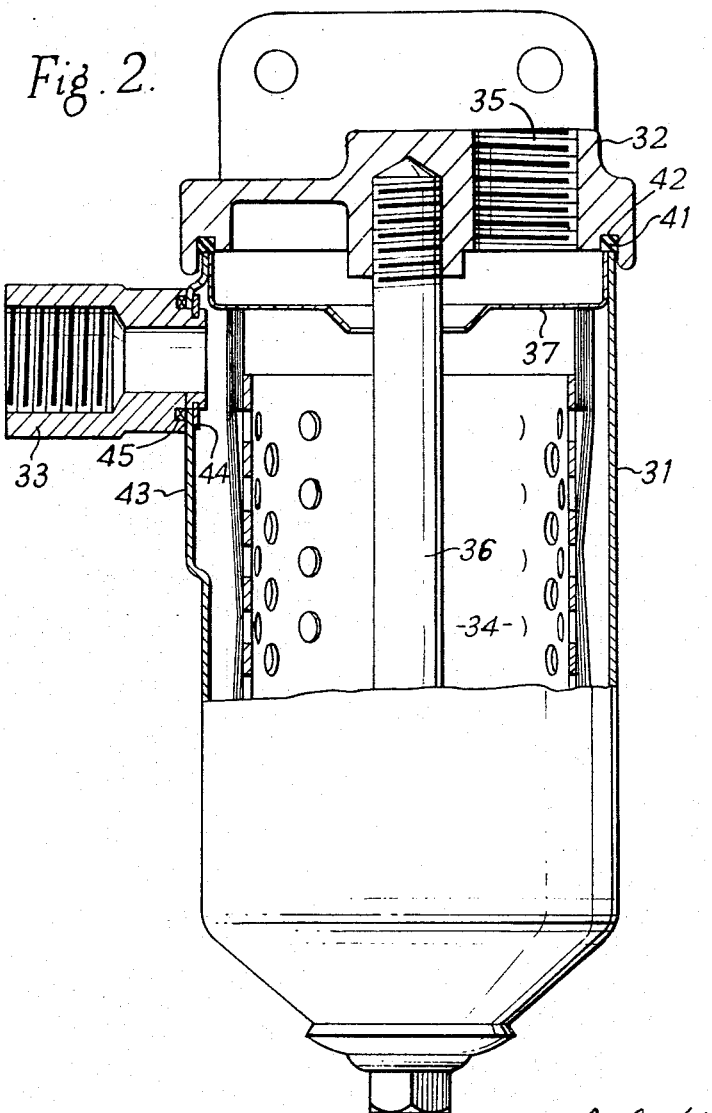
FIGURE 2 shows, partly broken-away and in section, a separate oil filter which could be attached to an engine or other machine and which includes certain modifications, as compared to the filter shown in FIGURE 1.

Referring to FIGURE 2, this shows a filter constructed as a separate unit which can be secured by bolts or other means to an engine or other machine or piece of equipment. In this case the filter includes a cover 31 which is attached to a body part 32 and which is similar to the cover 1, except for a modified form of attachment of the inlet boss, which is here shown at 33.

Mounted within the cover 31 is a filter element 34 through which oil entering by the inlet 33 passes and is filtered, before being discharged through an outlet 35 formed in the body part 32. The cover 31 is secured to the body part 32 by means of a stud 36, corresponding to the stud 6 of FIGURE 1, while the element 34 is clamped between an upper pressure member 37 and a lower pressure member (not shown), which latter corresponds to the member 18 and is fitted with a valve corresponding to the valve 21. All the parts in the lower portion of the filter which are not shown in FIGURE 2 in fact correspond exactly to those shown in FIGURE 1.

The upper pressure member 37 is also exactly similar to the member 17 and it forms a seal with a ring 41 fitted in a groove 42 in the body part 32, which ring is also engaged by the upper edge of the cover 31.

As shown in FIGURE 2, the cover 31 is formed with a relatively large flattened portion 43 to which the inlet boss 33, which may be made of metal or other rigid material, is rigidly connected. This could be done by welding or other means, but in the arrangement shown in FIGURE 2 attachment is effected by means of a split ring 44. Furthermore, a resilient sealing ring 45 of suitable section is fitted in a groove formed in the inlet boss 33, where it is engaged and compressed by the wall 43 of the cover 1.

Provided that the cover 31 of FIGURE 2 is made of a suitable material, such as metal which is not too thick, it may provide for all the angular movement of the inlet boss 33 which is needed. If it does not, additional flexibility could be provided by making the inlet boss 33 out of an elastomeric material and/or by providing a suitable arrangement of resilient sealing rings between the inlet boss 33 and the cover 31.

In the filters which have been described the oil or other fluid being filtered is admitted into the outer space within the filter casing, whence it flows inwardly through the filter element to the outlet. Other arrangements would, however, also be possible, including those in which the fluid being filtered passes outwardly through the filter element, providing that the pressure members and the pressure relief valve are suitably arranged so that the valve, which is normally closed, is made to open if clogging of the filter element should occur. In suitable cases, for example, it might be possible to interchange and/or reverse the upper and lower pressure members.

We claim:

A fluid filter comprising: a body portion formed with a passage for the fluid being filtered; a cover having an open end which engages and forms a seal with said body portion; coupling means at said cover for connection to fluid being filtered and including an inlet boss fitted into a hole in said cover and a ring locking said boss to said cover, said coupling means being formed at least in part of a resilient material to allow limited angular movement of the inlet boss relative to said cover; an inner pressure member having a central opening; an outer pressure member; an annular filter element engaged between said pressure members; pressure means between said outer pressure member and said cover biasing said pressure members against said filter element so as to form fluid seals within the filter between said pressure means and said filter element such that fluid flowing between said coupling means and said passage passes through and is filtered by said filter element; a threaded stud passing through said cover, said pressure members, and said filter element, said stud being spaced apart from said filter element and said inner pressure member to define a passageway therebetween, said outer pressure member being formed on a top part and cup-shaped bottom part, one of said parts having edge portions bent over the edge of the other part to secure said parts together at their edges to define a hollow pressure member, said stud passing loosely through a central opening in said top part to define a passageway therebetween, said stud further passing through a central aperture in said bottom part, a sealing ring of elastomeric material between said bottom part and said stud, said pressure means loading said sealing ring to bias said sealing ring into sealing engagement with both said bottom part and said stud, said bottom part being provided with an aperture spaced from the first mentioned aperture to define a valve seat; and a normally closed pressure relief valve of the mushroom type mounted on said bottom part including a valve member adapted to seat against said valve seat, a stem extending through said second mentioned aperture out of said hollow pressure member, a retaining member carried by said stem at its end opposite said valve member and a helical coil spring interposed between said retaining member and said bottom part biasing said valve closed and adapted to open when the pressure difference between the fluid entering and the fluid leaving said filter exceeds a predetermined value to allow fluid to bypass the said filter element.

References Cited by the Examiner

UNITED STATES PATENTS

| 2,304,453 | 12/1942 | Gudmundsen | 210—238 X |
| 2,606,662 | 8/1952 | Dyer | 210—451 |
| 2,731,154 | 1/1956 | Burnell | 210—130 X |
| 2,877,902 | 3/1959 | Chase et al. | 210—440 |
| 3,165,467 | 1/1965 | Klein et al. | 210—130 |

FOREIGN PATENTS 850,289   10/1960   Great Britain.

REUBEN FRIEDMAN, *Primary Examiner.*

F. SPEAR, *Assistant Examiner.*